(12) United States Patent
Giesler

(10) Patent No.: US 7,677,592 B2
(45) Date of Patent: Mar. 16, 2010

(54) BICYCLE POD TRANSPORT SYSTEM

(76) Inventor: Stephen Giesler, 125 Bridge Road, Sutton, P. Quebec (CA) J0E 2K0

( * ) Notice: Subject to any disclaimer, the term of this patent is extended or adjusted under 35 U.S.C. 154(b) by 812 days.

(21) Appl. No.: 11/352,781

(22) Filed: Feb. 13, 2006

(65) Prior Publication Data

US 2006/0208454 A1 Sep. 21, 2006

Related U.S. Application Data

(60) Provisional application No. 60/656,312, filed on Feb. 25, 2005.

(51) Int. Cl.
*B62D 53/00* (2006.01)

(52) U.S. Cl. ................. 280/656; 280/789; 280/762; 280/769

(58) Field of Classification Search ............... 280/400, 280/404, 415.1, 656, 769, 789, 762
See application file for complete search history.

(56) References Cited

U.S. PATENT DOCUMENTS

| | | | | |
|---|---|---|---|---|
| 639,991 | A * | 12/1899 | Jewell | 410/3 |
| 3,372,829 | A * | 3/1968 | Averill | 220/6 |
| 3,941,406 | A * | 3/1976 | Eggleston | 410/3 |
| 3,994,400 | A * | 11/1976 | Graber | 211/22 |
| 4,015,743 | A * | 4/1977 | Beretta | 220/485 |
| 4,126,324 | A * | 11/1978 | Browning | 280/42 |
| 4,128,258 | A * | 12/1978 | Johnson | 280/656 |
| 4,171,077 | A * | 10/1979 | Richard, Jr. | 224/500 |
| 4,253,595 | A * | 3/1981 | Tiffany | 224/328 |
| 4,277,008 | A * | 7/1981 | McCleary | 224/401 |
| 4,372,568 | A * | 2/1983 | Campbell | 280/63 |
| 4,442,961 | A * | 4/1984 | Bott | 224/570 |
| 4,522,425 | A * | 6/1985 | Cornwall et al. | 280/656 |
| 4,593,840 | A * | 6/1986 | Chown | 224/520 |
| 4,681,378 | A * | 7/1987 | Hellman, III | 312/223.2 |
| 4,758,008 | A * | 7/1988 | Moddejonge | 280/37 |
| 4,765,642 | A * | 8/1988 | Struzina | 280/656 |
| 4,998,023 | A * | 3/1991 | Kitts | 280/47.35 |
| 5,082,120 | A * | 1/1992 | Vega | 211/20 |
| 5,249,821 | A * | 10/1993 | Ricketts et al. | 280/638 |
| 5,299,826 | A * | 4/1994 | Flowers | 280/651 |
| 5,340,134 | A * | 8/1994 | Dodson | 280/37 |
| 5,476,200 | A * | 12/1995 | Wong | 224/405 |

(Continued)

*Primary Examiner*—S. Joseph Morano
*Assistant Examiner*—Jacob Meyer
(74) *Attorney, Agent, or Firm*—Schneck & Schneck; Thomas Schneck

(57) ABSTRACT

A trailer with interchangeable cargo specific pods positionable into alignment with a flatbed of the trailer and including fasteners in vertical alignment with fasteners of the trailer. The cargo specific pods may carry cargo such as bicycles, kayaks, canoes, skis, sailboats, skidoos, luggage, seadoos, surfboards, livestock, scoreboards, advertising panels, rowing sculls, contractor's equipment, camping units, and camper trailer pods. One or more pods may be placed on the flatbed at a time for transport by the trailer. One cargo pod includes doors to allow for easy access to cargo. A bicycle pod includes an arrangement of inclined grooved supports for receiving bicycle tires. Sets of hooks may be staggered in height from highest to lowest. Each grooved support includes a hook for hooking about a bicycle tire. A watercraft pod comprises a ladder assembly having opposing ladder towers, each tower including at least one support formed from a rung which pairs with an opposing rung. The ladder towers are supported by an adjustable brace assembly.

14 Claims, 14 Drawing Sheets

U.S. PATENT DOCUMENTS

| | | | |
|---|---|---|---|
| 5,526,971 A * | 6/1996 | Despain | 224/519 |
| 5,772,048 A * | 6/1998 | Sopcisak | 211/20 |
| 5,941,542 A * | 8/1999 | Kalman | 280/38 |
| 6,032,965 A * | 3/2000 | Sabounjian | 280/47.35 |
| 6,042,175 A * | 3/2000 | Williams | 296/185.1 |
| 6,145,720 A * | 11/2000 | Comeau | 224/521 |
| 6,170,856 B1 * | 1/2001 | Pena | 280/656 |
| 6,182,836 B1 * | 2/2001 | Gutierrez | 211/22 |
| 6,199,909 B1 * | 3/2001 | Kass et al. | 280/789 |
| 6,213,539 B1 * | 4/2001 | Williams et al. | 296/185.1 |
| 6,345,750 B1 * | 2/2002 | McCoy et al. | 224/525 |
| 6,398,290 B1 * | 6/2002 | Williams et al. | 296/185.1 |
| 6,669,269 B1 * | 12/2003 | Tran-Ngoc | 296/156 |
| 6,761,297 B1 * | 7/2004 | Pedrini | 224/519 |
| 6,796,565 B2 * | 9/2004 | Choi et al. | 280/47.35 |
| 6,910,609 B2 * | 6/2005 | Williams et al. | 224/519 |
| 6,962,370 B2 * | 11/2005 | Simpson | 280/789 |
| 7,073,816 B1 * | 7/2006 | Larson et al. | 280/656 |
| 7,111,765 B1 * | 9/2006 | Blakley | 224/506 |
| 7,165,779 B2 * | 1/2007 | Badger et al. | 280/656 |
| 7,219,919 B2 * | 5/2007 | Tipton | 280/651 |
| D583,716 S * | 12/2008 | Ross et al. | D12/115 |
| 2002/0063142 A1 * | 5/2002 | Williams et al. | 224/519 |
| 2002/0158442 A1 * | 10/2002 | Harrington | 280/400 |
| 2003/0155748 A1 * | 8/2003 | Picard et al. | 280/656 |
| 2004/0050807 A1 * | 3/2004 | Cheng | 211/17 |
| 2004/0118884 A1 * | 6/2004 | Ford et al. | 224/310 |
| 2005/0040613 A1 * | 2/2005 | Williams et al. | 280/30 |
| 2005/0093273 A1 * | 5/2005 | McDonell | 280/656 |
| 2005/0179235 A1 * | 8/2005 | Stewart et al. | 280/656 |
| 2006/0181063 A1 * | 8/2006 | Eddings | 280/656 |
| 2006/0208454 A1 * | 9/2006 | Giesler | 280/415.1 |
| 2007/0126209 A1 * | 6/2007 | Wolfe | 280/656 |
| 2007/0132208 A1 * | 6/2007 | Winter et al. | 280/656 |
| 2007/0132211 A1 * | 6/2007 | Tai | 280/656 |
| 2008/0047994 A1 * | 2/2008 | Beamer et al. | 224/403 |
| 2008/0223800 A1 * | 9/2008 | Cole | 211/22 |

* cited by examiner

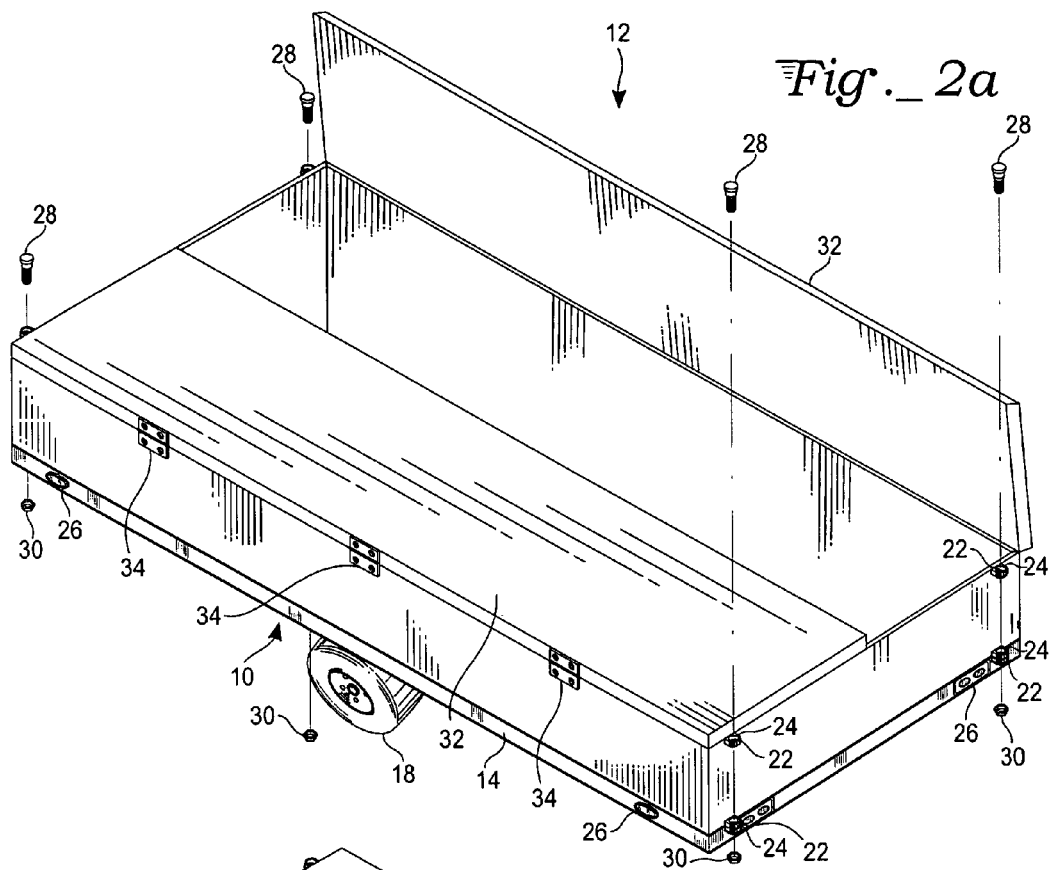
Fig._2a
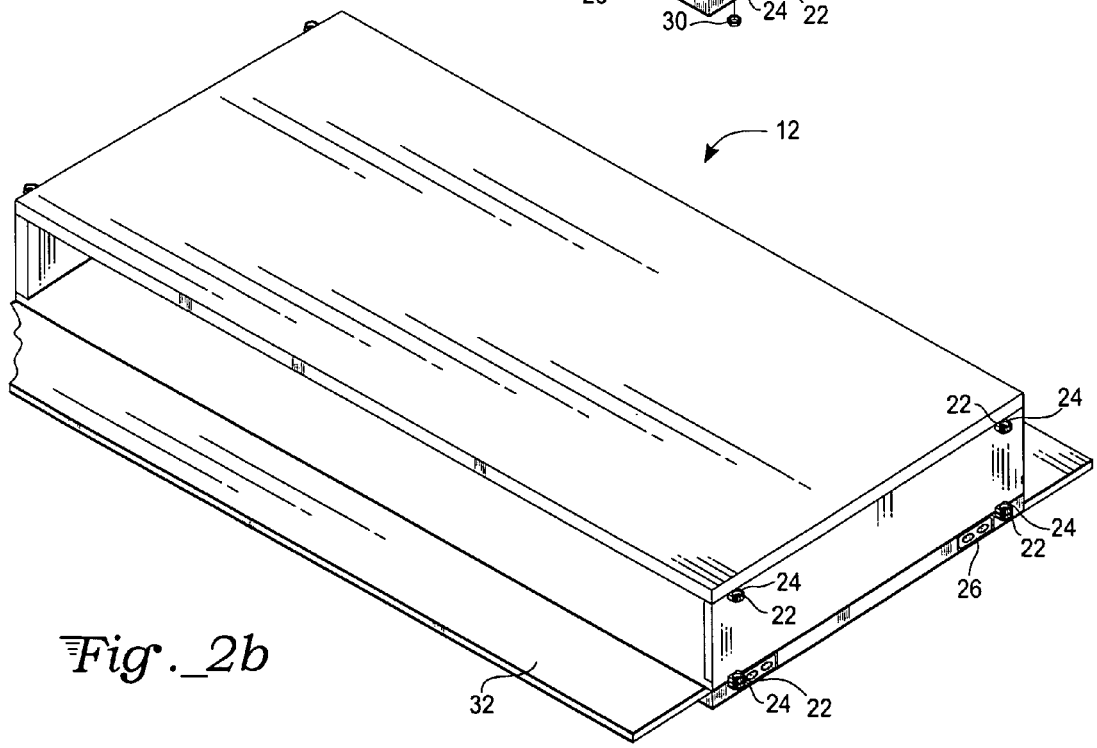
Fig._2b

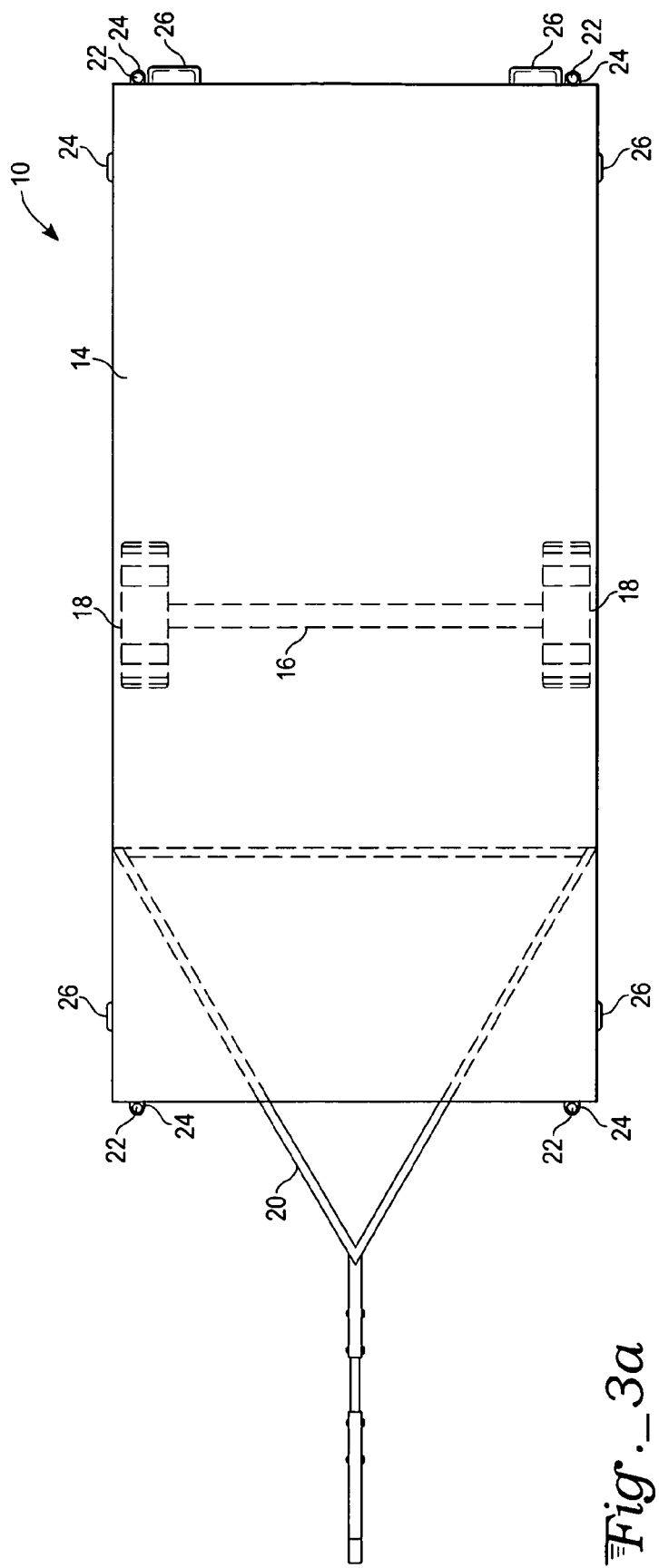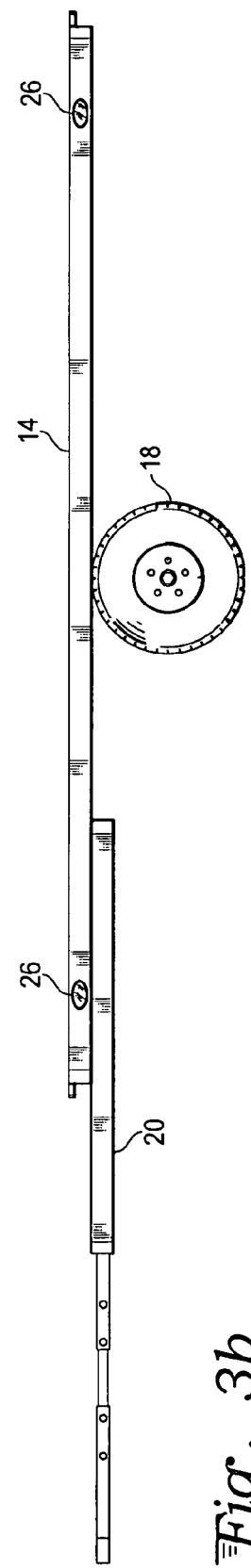

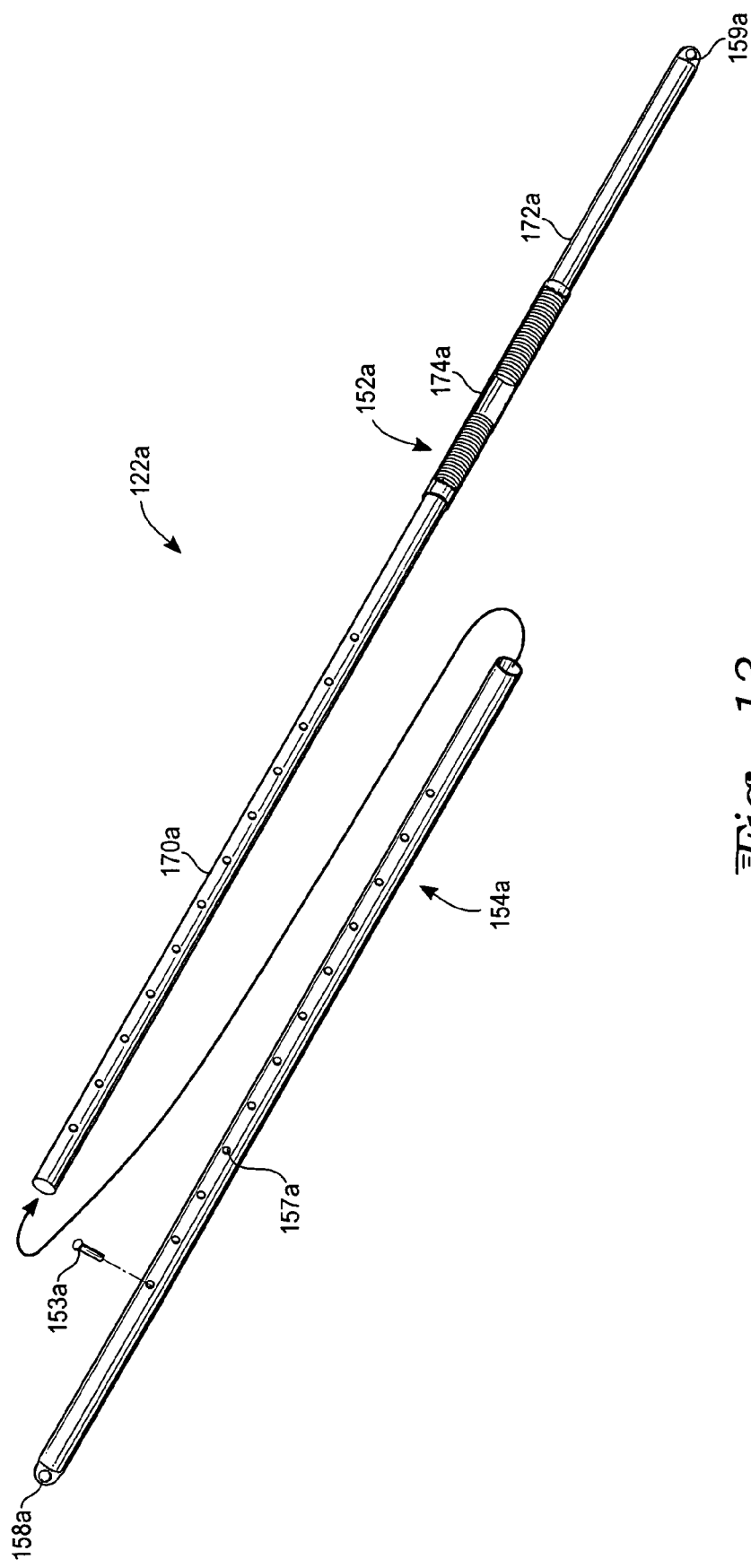
Fig._13

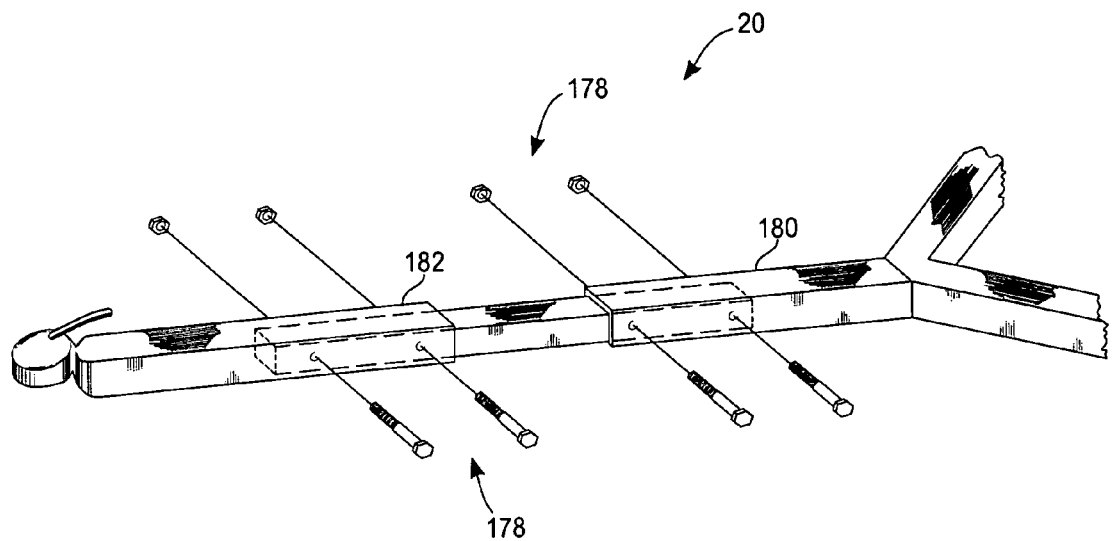
Fig. _ 14
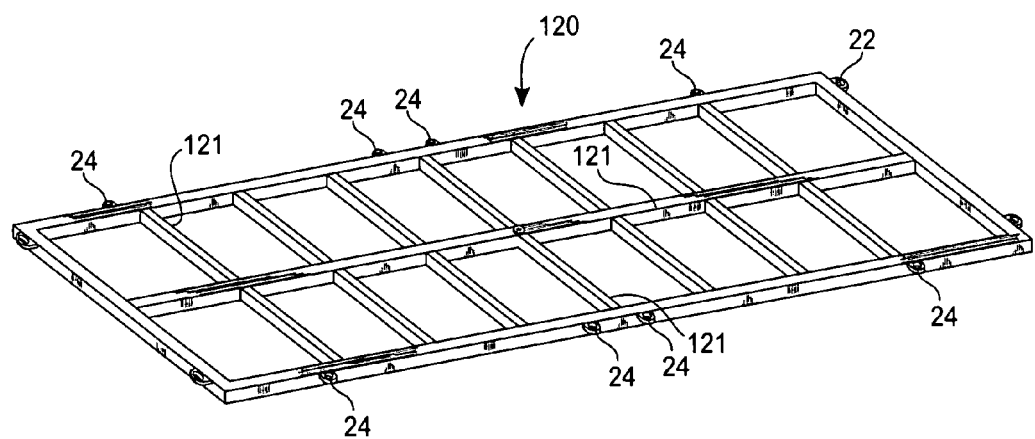
Fig. _ 15

BICYCLE POD TRANSPORT SYSTEM

CROSS-REFERENCE TO RELATED APPLICATION

This application claims priority from U.S. provisional application No. 60/656,312, filed Feb. 25, 2005 which is hereby incorporated by reference.

FIELD OF THE INVENTION

The invention relates generally to the field of cargo transport, and more particularly to an apparatus for transporting interchangeable cargo pods and to interchangeable cargo pods.

BACKGROUND OF THE INVENTION

Trailers are commonly used to transport various types of cargo as they are towed behind vehicles. However, many of the prior art trailers are suited for towing a specific type of cargo. Therefore, often times, one must use a different trailer to transport different types of cargo. Using different trailers to transport different types of cargo can be quite costly.

Flatbed trailers are utilized to transport different types of cargo. For example, U.S. Patent Application Publication No. 2003/0155748 to Picard et al. describes a modular trailer including a base frame for receiving modular carrier assemblies.

However, prior art trailers may be complicated, cumbersome, and difficult to handle. Much time and effort is required to assemble and to utilize such trailers.

Further, some prior art cargo pods, holding cargo such as bicycles, do not make efficient use of the pod space. Additionally, when transported by trailers, these pods do not make efficient use of the space on the trailer.

Therefore, it is an object of the present invention to provide an apparatus capable of efficiently transporting various types of cargo.

It is another object of the present invention to provide an apparatus for transporting interchangeable cargo.

It is yet another object of the present invention to provide a new and improved apparatus for easily transporting one or more cargo pods.

It is an object of the present invention to provide a bicycle pod for efficient storage and/or transport of bicycles.

It is an object of the present invention to provide a new and improved bicycle pod.

It is another object of the present invention to provide a watercraft pod for storage and transport of watercraft items and/or any other desired items.

It is an object of the present invention to provide a new and improved interchangeable cargo pod.

SUMMARY OF THE INVENTION

These and other objects have been achieved by a system including a trailer having a flatbed with bolt (or other fastener) openings at a desired location (for example, at or near the corners of the flatbed) and at least one cargo pod that is supported by the flatbed having length and width dimensions the same as the trailer flatbed and bolt openings in vertical alignment with the bolt openings of the flatbed. The bolt openings may be flush with a surface of the flatbed and a surface of the cargo pod(s). Thus, each cargo pod is fully supported by the flatbed and is easily connected to and disconnected from the flatbed as the bolt openings are in vertical alignment and only one bolt is needed to secure the pod to the flatbed at each bolt opening. The trailer further includes an axle and wheel located beneath the flatbed for movement of the trailer and a hitch for connection to a transport vehicle. The flatbed may further include lighting elements to provide for night travel and traffic signals.

The cargo pods transport various types of cargo including, but not limited to bicycles, canoes, luggage, sail boats, kayaks, skis, skidoos, seadoos, surfboards, contractor's equipment, livestock, rowing sculls, scoreboards, and advertising panels, camper units, and camper trailer pods (including, for example, windows, bed, kitchen, shower, and toilet).

In one embodiment of the present invention, a first interchangeable cargo pod comprises side or top doors for easy access to cargo. Its length and width dimensions are the same as the trailer flatbed.

In another embodiment of the present invention, a bicycle pod supporting bicycles includes one or more arrangements of inclined grooved supports for supporting bicycles. Each grooved support includes a groove receiving bicycle tires and includes a hook for hooking about a bicycle tire. In one example of a grooved support arrangement, half of the grooved supports are arranged in a row and are inclined upwardly at a same or substantially same angle. In the same arrangement, the other half of the grooved supports are arranged in a second row, and alternatively dovetail with the opposite grooved support of an equal numbered position in the opposing row, and incline upwardly at a same or a similar angle measured from the opposing side.

Each grooved support includes a hook at a high end of each grooved support. Each hook and grooved support accommodates one bicycle. The hooks each hold a bicycle wheel (typically a front wheel). The front wheel is engaged by the hook and the grooved support and the bicycle's back wheel is secured lower down in the same grooved support, thus immobilizing the bicycle in the grooved support such that it is unable to substantially move up or down the grooved support. In one example, the hooks are staggered in height across each row of grooved supports. Typically, one hook differs in height from the neighboring hook disposed on a similarly or same sloped grooved support. For example, the hooks may differ in height placement as compared to the neighboring hook by 6 inches. The height pattern of the hooks may be repeated. For example in a repeating set of three hooks, if one hook is at an elevation of 7 feet, the neighboring hook would be disposed at a height of 7 feet, six inches, and the next neighboring hook would be disposed at a height of 8 feet. The next neighboring hook would be disposed again at a height of 7 feet and the pattern would repeat.

Each bicycle supported by the bicycle pod may further be secured by a rotatable swivel including a retrievable and retractable dowel having a fastener for fastening to the bike, in addition to other fasteners.

The bicycle pod stores bicycles and allows for easy transport of the bicycles. The bicycle pod is an example of an interchangeable cargo pod that may be transported by the trailer system described above. In one example, the bicycle pod includes a frame having the same length and width dimensions as the trailer flatbed and fastener openings disposed in vertical alignment with fastener openings of the trailer flatbed. This allows for easy connection and disconnection of the bicycle pod to the trailer.

In another embodiment of the present invention, an interchangeable pod comprises a watercraft pod. The watercraft pod is, for example, formed on a frame having the same length and width dimension of a trailer flatbed used for transport. The watercraft pod comprises a ladder assembly having first and second ladder towers opposing each other. Each ladder tower includes a support formed with one or more rungs extending from a spacer that pair with an opposing rung thus providing a support surface for a desired item, such as a canoe or kayak. The ladder assembly is supported by a brace assembly including two adjustable braces forming a "v" shaped support structure. The "v" shaped support structure is connected to the ladder assembly at the high ends of the "v". The braces connect to each other and to the flatbed or other interchangeable pod at the low end of the "v" shaped support structure.

The braces are adjustable, for example by threading one brace member into or out of the other, and into or out of a threadable sleeve, as well as, for example, by using pin-connectors for step adjustments.

In one example, the first interchangeable cargo pod is disposed between the trailer flatbed and a second cargo pod, such as the bicycle pod or the watercraft pod.

BRIEF DESCRIPTION OF THE DRAWINGS

FIG. 2a is a perspective view of the cargo pod of FIG. 1 coupled to the trailer of FIG. 1.

FIG. 2b is a perspective view of a side opening cargo pod coupled to the trailer of FIG. 1.

FIG. 3a is a top view of the trailer of FIG. 1.

FIG. 3b is a side view of the trailer of FIG. 1.

FIG. 13 is a perspective view of an adjustable brace of FIG. 10.

FIG. 14 is a perspective view of a trailer hitch used with a trailer of the present invention showing how tongue extension is accomplished for loads such as a sail boat.

FIG. 15 is a perspective view of the frame of the watercraft pod of FIG. 10 which itself can be used as an interchangeable pod.

DETAILED DESCRIPTION OF THE INVENTION

Figure 1:
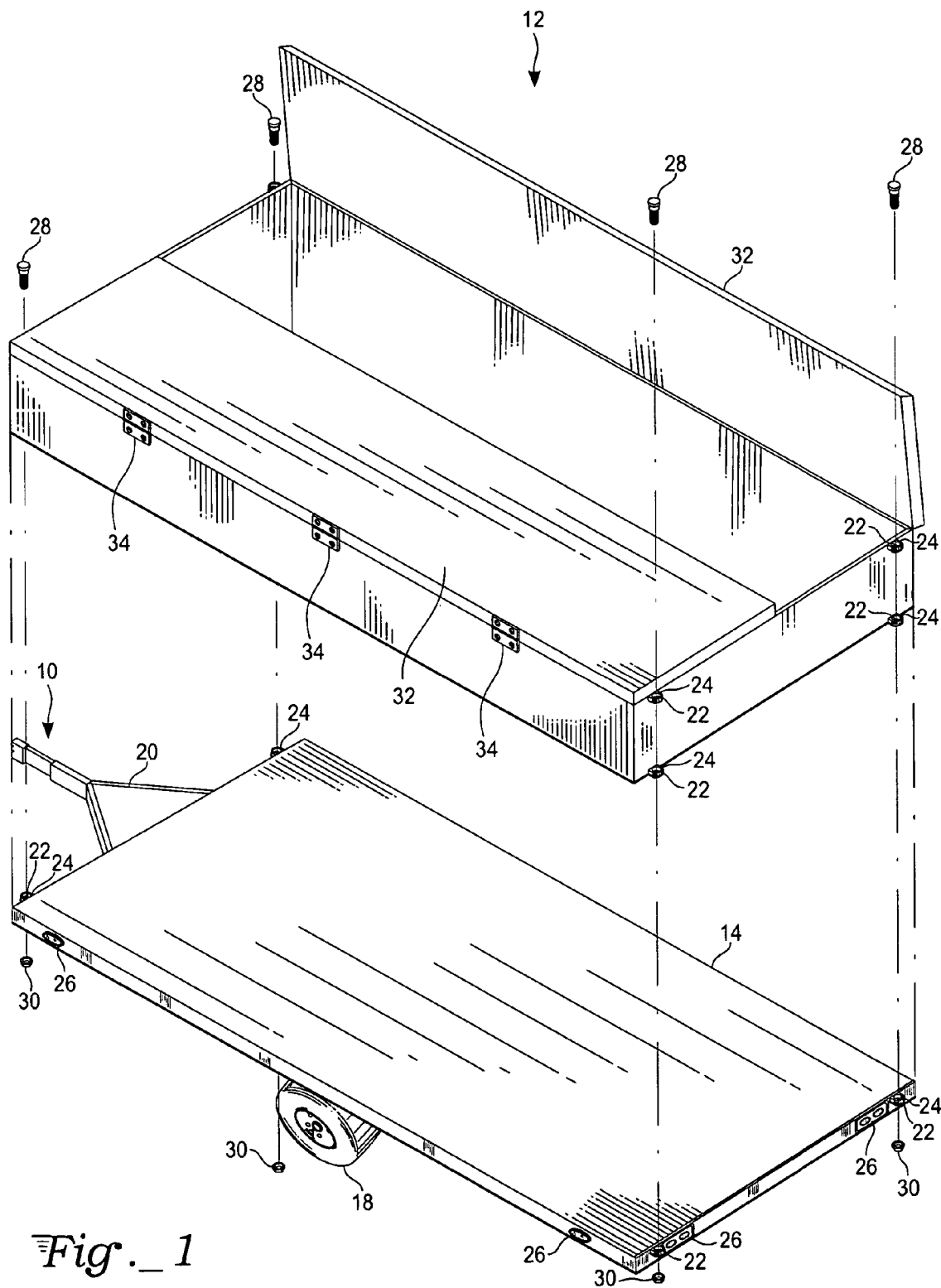
FIG. 1 is a perspective view of a trailer and an interchangeable cargo pod of the present invention.

With reference to FIGS. 1, 2, 3a, and 3b of the present invention, there is seen a trailer 10 of the present invention and an interchangeable cargo pod 12 to be transported by the trailer. The trailer features a flatbed 14 upon which the cargo pod 12 and/or other interchangeable cargo pods rest. The trailer includes an axle 16, such as a torsion axle, on a bottom surface of the flatbed with a pair of wheels 18 for trailer movement. The trailer also includes a front hitch 20 for hitching the trailer to a vehicle (not shown) for transport. Hitch 20 is described in greater detail below with regard to FIG. 14. Each interchangeable pod described below may have a corner "pipe mount" jacking point welded in place. When these four points are engaged by rollable top winding jacks, any pod can be lifted and wheeled away quickly and efficiently.

The flatbed 14 and the cargo pod 12 have a same length and width. In one example, the flatbed is 12 feet long and 6 feet wide, and the cargo pod 12 has those same dimensions. The flatbed 14 and the cargo pod 12 include bolt openings or openings for other fastening means/fasteners 22. The fastener openings, for example bolt openings, of the cargo pod 12 are in vertical alignment with the bolt openings of the trailer 10. In one example, the bolt openings of the trailer 10 and the cargo pod 12 are at or near the corners of the trailer 10 and the cargo pod. Bolt openings, in one example, are a pair of plates, such as semi-circular plates 24, which may be flush against an upper and/or lower surface of the flatbed and an upper and/or lower surface of the cargo pod. In one example, "pipe mount" jacking points are welded to or near each pod's four corners. Lights 26 may be disposed on the flatbed 14 to provide for night travel and traffic signals light. Bolts 28 are inserted within the bolt openings to secure the cargo pod to the flatbed of the trailer. Nuts 30 secure the bolts.

Figure 4:
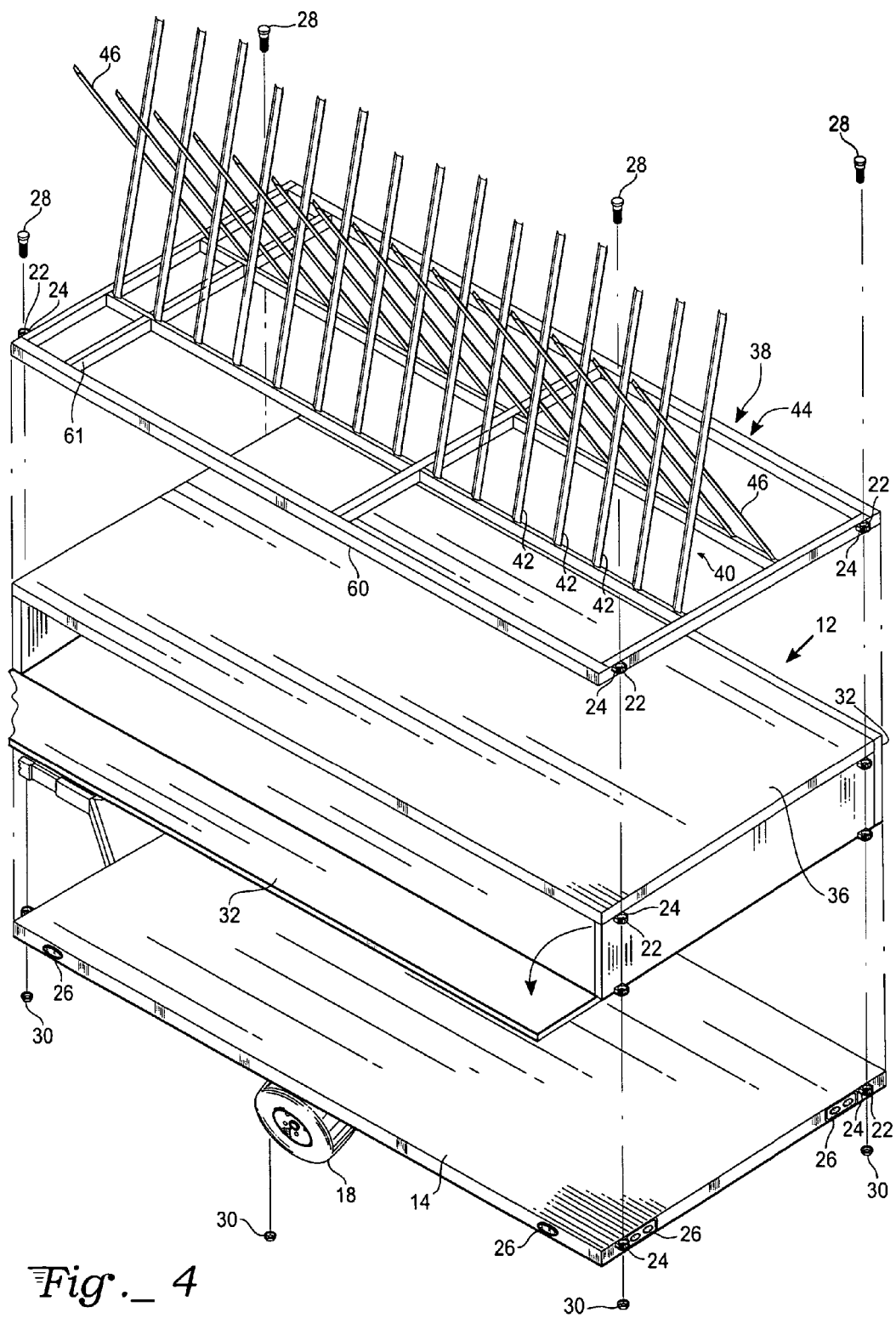
FIG. 4 is a perspective view of the trailer of FIG. 1, the cargo pod of FIG. 2b, and a partial view of a bicycle pod of the present invention not showing a turret swivel rod.

Interchangeable cargo pod 12 stores items such as luggage, or any other desired items. It includes doors 32 which hinge open or shut via hinges 34. Downward opening side doors, as seen in FIG. 2b and FIG. 4, allow access to the cargo pod 12 and, once opened, may serve as cooking or serving platforms in a camp or other setting. Side doors also allow for removal of items within cargo pod 12 without having to remove any pod disposed on top of pod 12. FIG. 4 shows a rear side opening door opposing front side opening door 32 in a closed position. Alternatively doors 32 may open from the top as seen in FIGS. 1 and 2a. Cargo pod 12 may be the only pod transported by the trailer, as seen in FIG. 1, or it may be transported with another interchangeable pod, such as a bicycle pod 38 (FIG. 4), a bicycle pod 68 (FIG. 7), a watercraft pod 116 (FIG. 10), or a frame pod 120 (FIG. 15). Alternatively, the bicycle pod 38, a portion of which is seen in FIG. 5, bicycle pod 68, or other types of cargo pods, may be transported by the trailer without an additional cargo pod.

Figure 5:
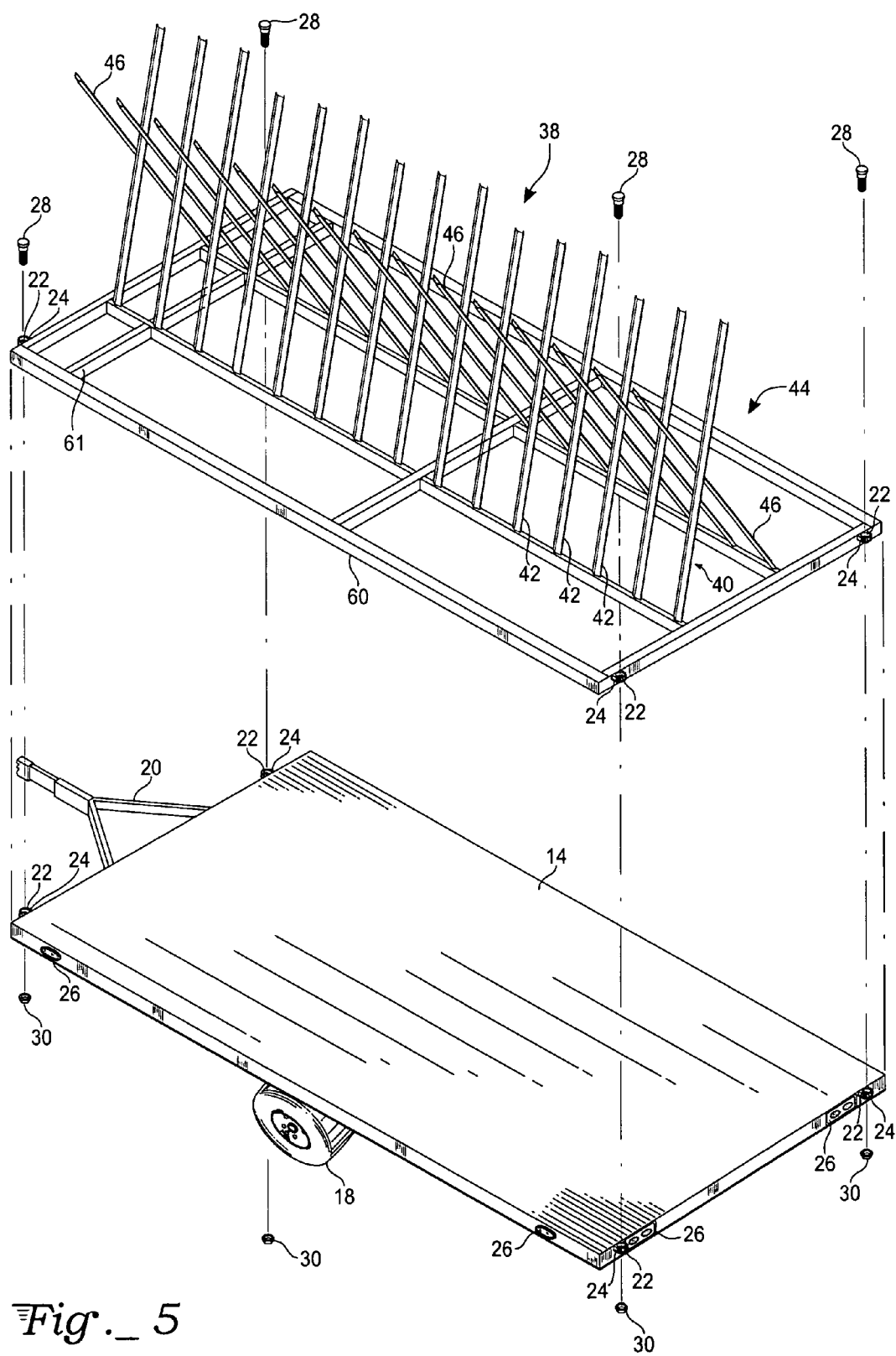
FIG. 5 is a perspective view of the trailer of FIG. 1 and the bicycle pod of FIG. 4.
Figure 6:
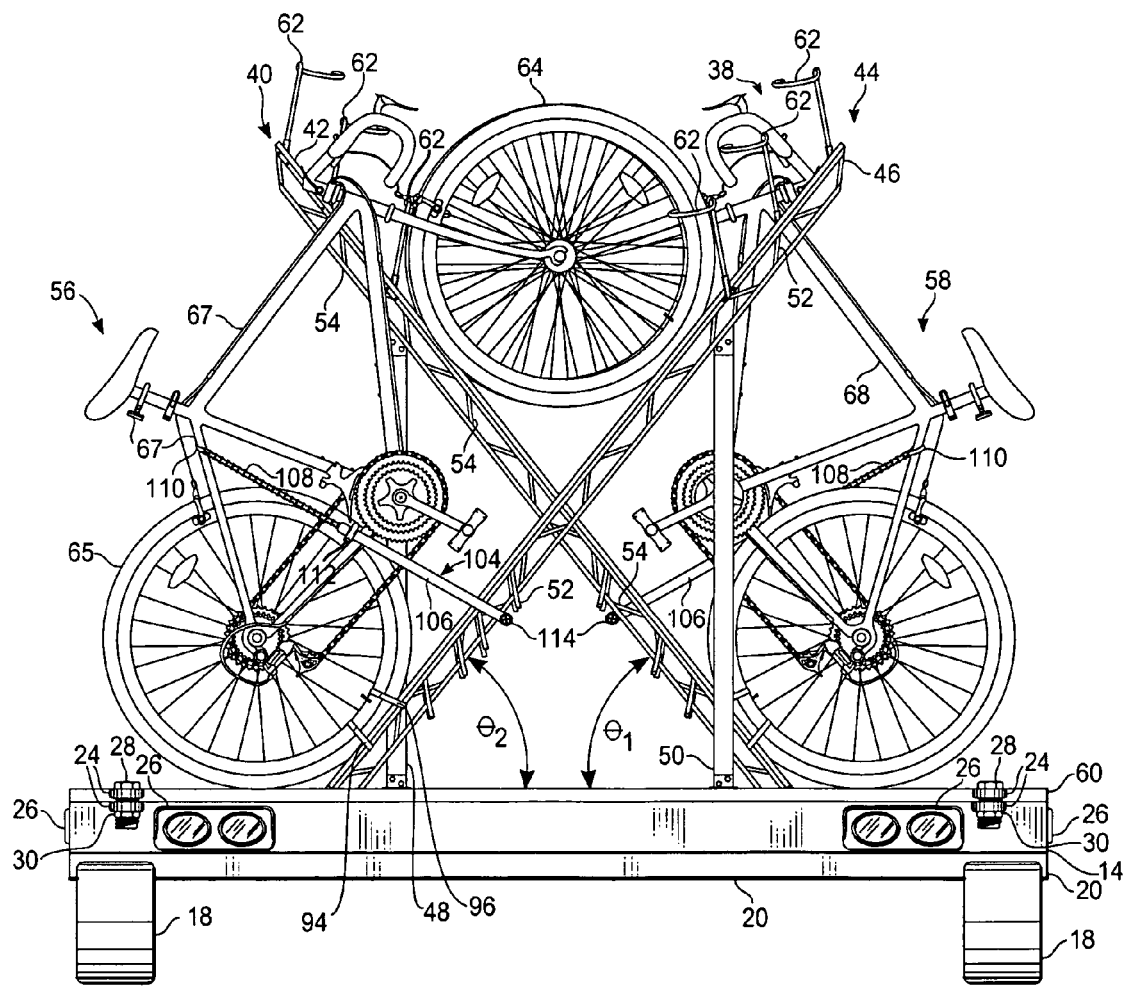
FIG. 6 is a rear view of the bicycle pod of FIGS. 4 and 5 with an optional support structure and support stand and showing the turret swivel rod.

Referring to FIGS. 4-6, interchangeable bicycle pod 38 includes a first row 40 of grooved supports 42 and a second row 44 of grooved supports 46. In the pictured exemplary grooved support arrangement, half of the grooved supports 42 arranged in row 40 are inclined upwardly at a same or substantially same angle $\theta_1$ (typically a steep angle). In the same example, the other half of the grooved supports 46 arranged in row 44, each alternate with an opposite grooved support 42 of an equally numbered position in the opposing row, and incline upwardly at an opposing or substantially opposing angle $\theta_2$. For example, grooved supports 46 each form a 45 degree angle $\theta_2$ (or approximately a 45 degree angle) with the flatbed where the opposing grooved supports 42 each have a 135 degree angle $\theta_1$ (or approximately 135 degrees).

In one example, the distance between each grooved support in the same row 40 or 44 is 10 inches, from center to center. In the same example, the grooved supports 42 are disposed at, for example, a 5 inch distance from their opposing grooved support 46. In one example, each grooved support is connected to an opposing grooved support via a connection such as a dovetailing connection known in the art. The grooved supports connect to each other at a lower portion of the supports to strengthen the connection.

As seen in FIG. 6, each grooved support 42 and 46 include, in one example, support structures 54 and 52, respectively, to provide further support to each grooved support. Support structures may include, for example, supportive rails. Rows of support stands 48 and 50 are used, in one example, to support the grooved supports.

Referring back to FIGS. 4 and 5, any number of inclined grooved supports which can be accommodated by a frame, such as frame 60, may be used in the interchangeable pod. Frame 60 may include internal frame members 61 upon or with which grooved supports may rest or form a connection, such as a dovetail connection. Each row of inclined grooved supports may be braced at internal length-wise members 61. Only one width-wise internal member 61 is shown but multiple width-wise members may be used to support the grooved supports. In the pictured example of FIG. 4, fifteen grooved supports per row are used to support up to fifteen bicycles 56 and 58 (FIG. 6) on each row 40 and 44, respectively. Alternatively, other numbers of grooved supports per row may be used to accommodate a corresponding number of bicycles.

The grooved supports are connected to the removable frame 60 for support and are separable from the trailer 10 and/or the cargo pod 12 (if cargo pod 12 is present beneath the bicycle pod and above the flatbed). The size of the frame and the distance between and size of each grooved support 42 and 46 determines the number of bicycles that may be accommodated. Frame 60 of the pod 38 has length and width dimensions that are the same as flatbed 14. The fastener openings that are disposed on the frame and flatbed and that are in vertical alignment 24 may comprise part of a plate, such as semi-circular plate 24. Other types of cargo pods may be used with the trailer 10 instead of, or in addition to the bicycle pod 38.

Referring to FIG. 6, each grooved support 42 and 46 includes a hook 62 at a high end of each grooved support. Each hook 62 and grooved support 42 or 46 accommodates one bicycle, 56 or 58, respectively. The hooks 62 each hold a bicycle wheel (typically a front wheel). For example, a front wheel 64 is engaged by hook 62 and the grooved support 46 and the bicycle's back wheel 65 is secured lower down in the same grooved support 46, thus immobilizing the bicycle 56 in the grooved support 46 such that it is unable to move up or down the grooved support. Bicycle 58 is immobilized similarly in grooved support 42.

In one example, the hooks 62 are staggered in height across each row of grooved supports 42 and 46. Typically, one hook 62 differs in height from the neighboring hook disposed on a similarly or same sloped grooved support 42 or 46. For example, the hooks may differ in height as compared to the neighboring hook on the same row by 6 inches.

The height pattern of the hooks may be repeated. For example, in a repeating set of three hooks, if one hook is at a height of 7 feet, the neighboring hook would be disposed at a height of 7 feet, six inches, and the next neighboring hook would be disposed at a height of 8 feet. After that, the next neighboring hook would be disposed at a height of 7 feet and the pattern of increasing in height by 6 inches would repeat.

In the depicted example of FIG. 6, the hooks are staggered in height from highest to lowest in a repeat pattern including sets of three hooks. Therefore, only three hooks per row are visible in this view. In FIG. 6, tire 64 of bicycle 56 is hooked by the lowest hook 62 (row 44). A tire of bicycle 58 (not seen and located behind tire 64) is hooked by the lowest hook 62 (row 40).

Figure 7:
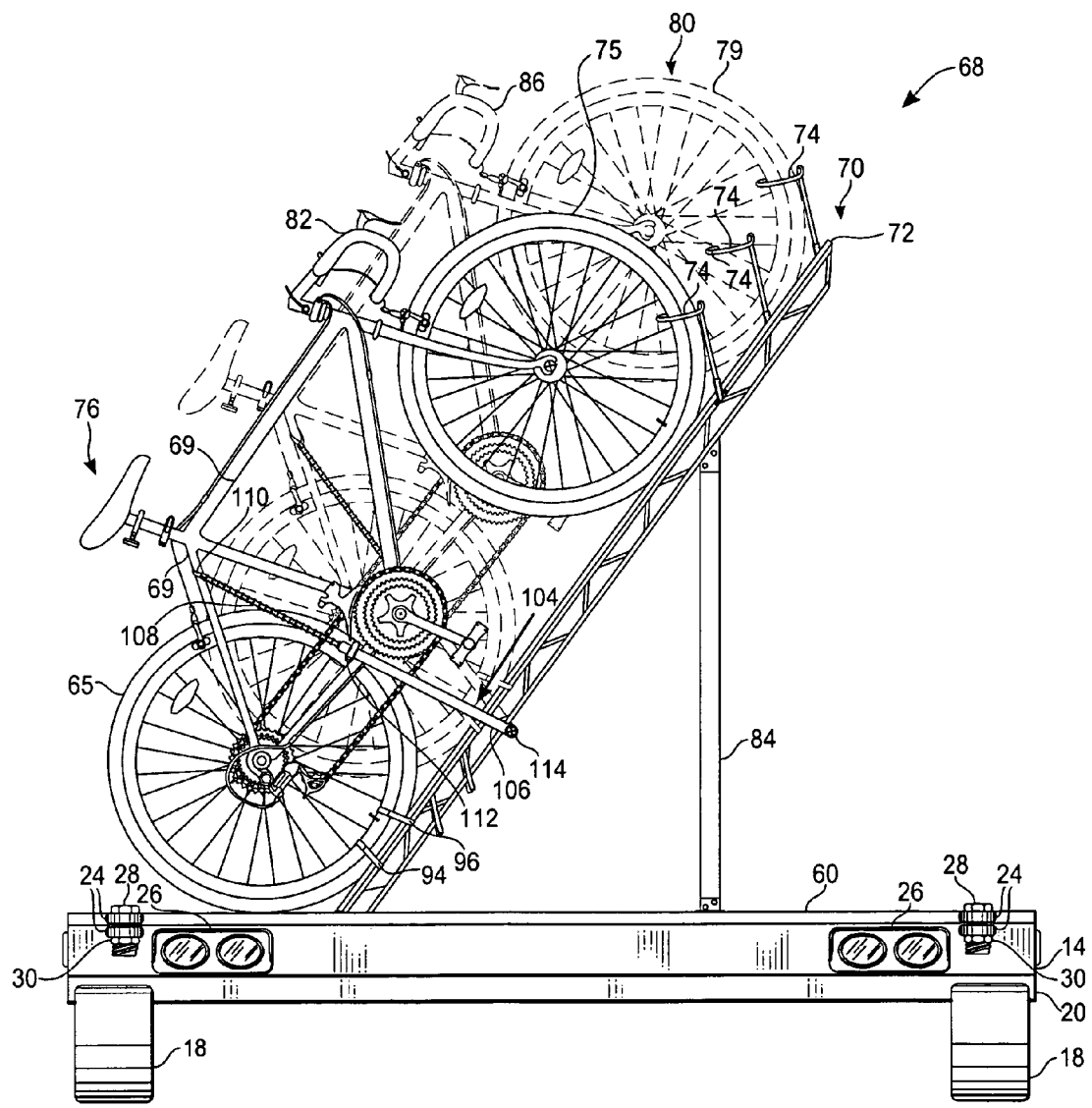
FIG. 7 is a rear view of a bicycle pod of the present invention with an optional support structure and support stand and showing a turret swivel rod.

With reference to FIG. 7, staggered hooks 74 of a single row of inclined grooved supports 70 of bicycle pod 68 are seen. An arrangement of bicycle pod 68 features single row 70 of three inclined supports 72 having hooks 74 staggered in height in a set of three from highest to lowest. Each hook hooks about a bicycle tire to support a bicycle. Only one of the grooved supports 72 is seen because the others are in height and angle alignment with and behind the front grooved support. A tire 75 of a first bicycle 76 is supported by the lowest hook 74 and is received by a grooved support 72. A tire 79 of a second bicycle 80 depicted in phantom lines is supported by the highest hook 74 and a grooved support (last in the row) and a lower tire 81 is supported in the same grooved support. It is seen that the handlebars 82 and 86 of the bicycles are not entangled due in part to the staggered hook height. A third bike (not shown) is supported by the middle hook 74 of the pod 68 and a middle grooved support 72. The handlebars of the various bicycles are in nestled relation. Any desired number of hooks may be disposed on any desired number of grooved supports in various heights. One or more stands 84 may support row 70.

Typically, the grooved support with highest hook is engaged by a bicycle first, the middle hook second, and the lowest hook third. For instance, where there are two sets of three hooks staggered in height from highest to lowest, two users may each engage the highest of the hooks with a bicycle tire for ease in loading.

Typically, when loading a bicycle onto a bicycle pod of the present invention, the bicycle is loaded front wheel first so that a hook can readily be hooked about a tire (typically the front tire) and so that both bicycle tires can be received by an inclined grooved support.

Figure 8:
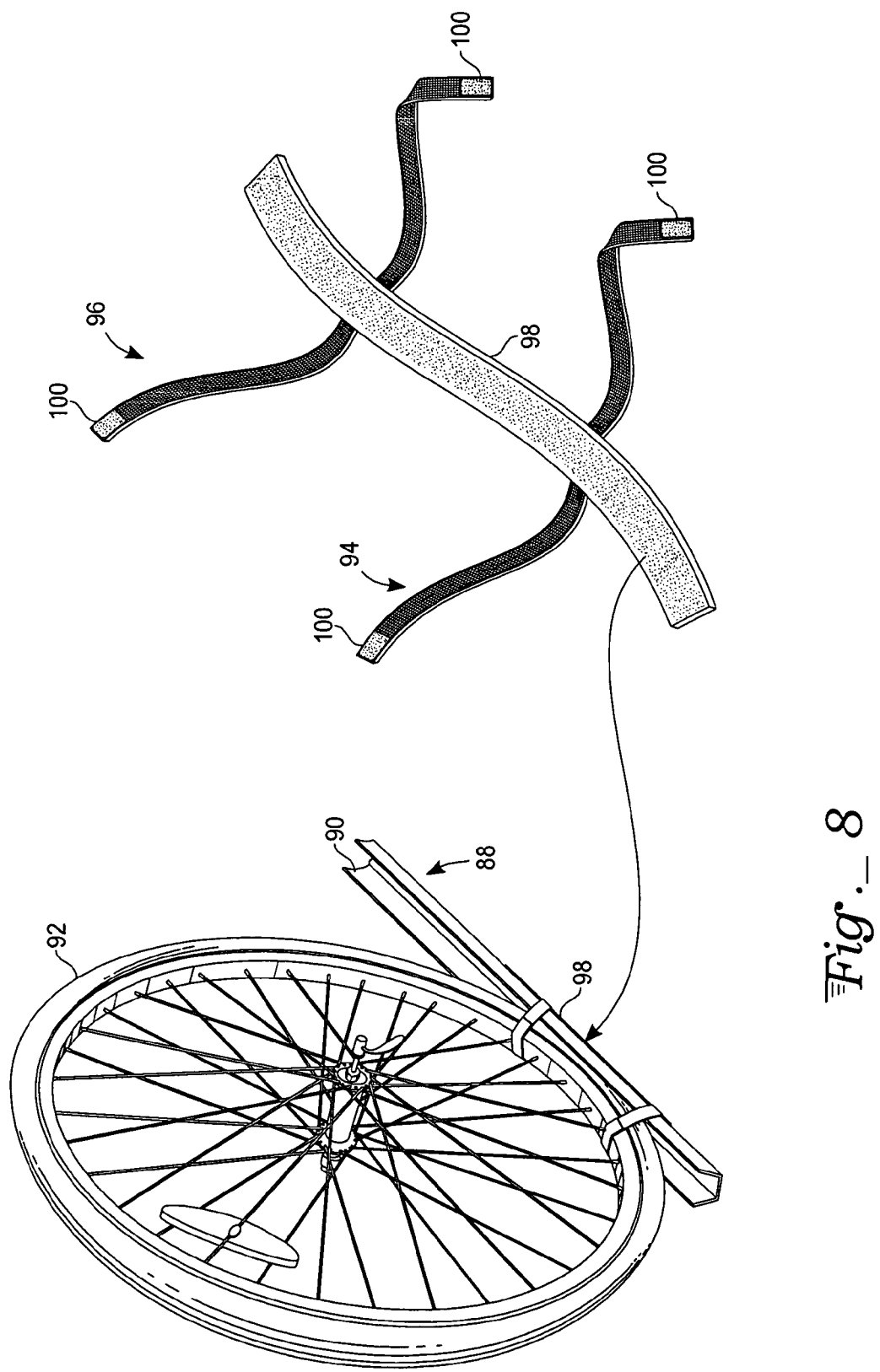
FIG. 8 is a perspective view of a portion of a bicycle pod of the present invention and a magnified view of a bicycle tire fastening device used in the bicycle pod.

With reference to FIG. 8, a portion of an inclined grooved support 88 belonging to any bicycle pod of the present invention is seen featuring a groove 90. A bicycle tire 92 is shown disposed within the groove. Front and rear tires of a bicycle fit snugly within the grooves of a bicycle pod of the present invention as seen in FIGS. 6 and 7, and one or more of the tires are secured to the groove by a tire fastening device. In one example, the fastening device comprises a first strap 94 and a second strap 96 for wrapping about the grooved support 88 and the bicycle tire 92, typically a rear tire. The straps comprise, for example, VELCRO or nylon webbing. The straps 94 and 96 are attached to a strip of material 98 which is adhered to a bottom surface of the inclined grooved support 88. The material comprises, for example, Velcro.

Figure 9:
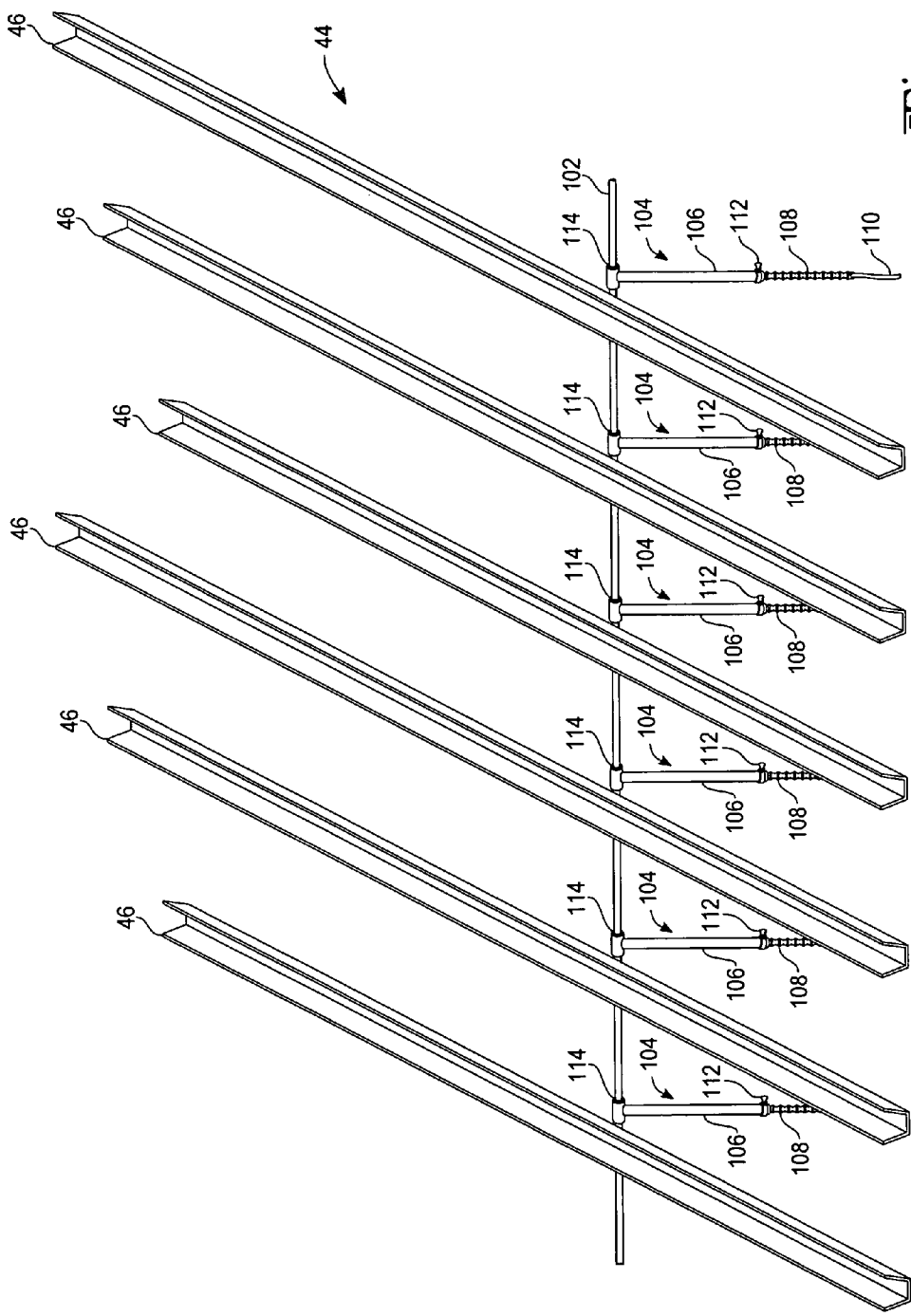
FIG. 9 is a side view of a portion of one row of grooved supports of the bicycle pod of FIG. 6 including the turret swivel rod.

With reference to FIG. 9, inclined grooved supports 46 are seen in conjunction with a turret swivel rod 102 extending across the row of grooved supports. Each row of grooved supports in any bicycle pod of the present invention may include the rod 102. In the depicted example, the rod extends across grooved support row 44, partially depicted, and may extend across any grooved support. The rod is, for example, plastic coated metal. The rod may be affixed to a rear surface of the grooved supports. A plurality of turret swivels 104 is rotatable about the rod 102. Each swivel includes a holder 106 for a dowel 108. The dowel is retrievable from and retractable into the turret swivel holder. The turret swivel and rod arrangement may be used with any bicycle pod of the present invention. After the bicycle tires, for example tires 64 and 65 of FIG. 6, have been received within the grooved support 46, the turret swivel 104 is rotated about the rod 102 and the dowel 108 is pulled out of the holder 106 to make contact with a desired bicycle component such as a bike frame 67 (FIG. 6). As seen in FIGS. 6 and 7, each dowel 108 is attached to the desired point on the bicycle frame 67, frame 68, or frame 69. The dowel 108 may be fastened to the bicycle frame by a Velcro strap 110. A lock, such as a quick release cam 112, is used to lock the dowel to its desired position. The turret swivel and rod arrangement provides lateral stabilization of the bicycle which it engages. The turret swivel and dowel may be comprised of any sufficiently strong material. One turret swivel and dowel arrangement is typically used per bicycle on the bicycle pod. In one example, neoprene washers, one of which 114 is seen, are disposed on either side of each turret swivel and serve to silence or reduce any noise associated with rotation of the turret swivel, especially when traveling free of bikes.

Figure 10:
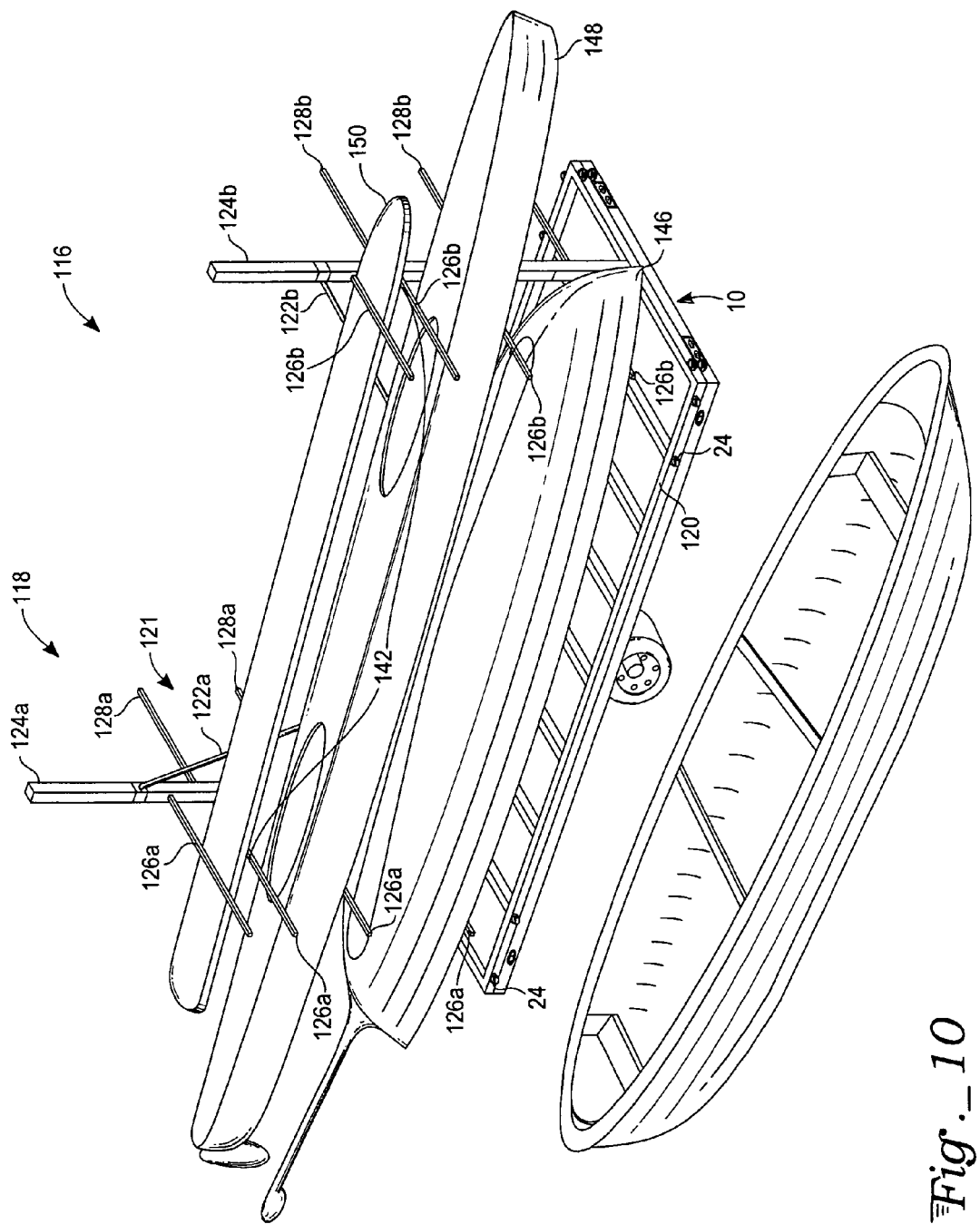
FIG. 10 is a perspective view of a trailer and watercraft pod of the present invention supporting water vehicles.
Figure 11:
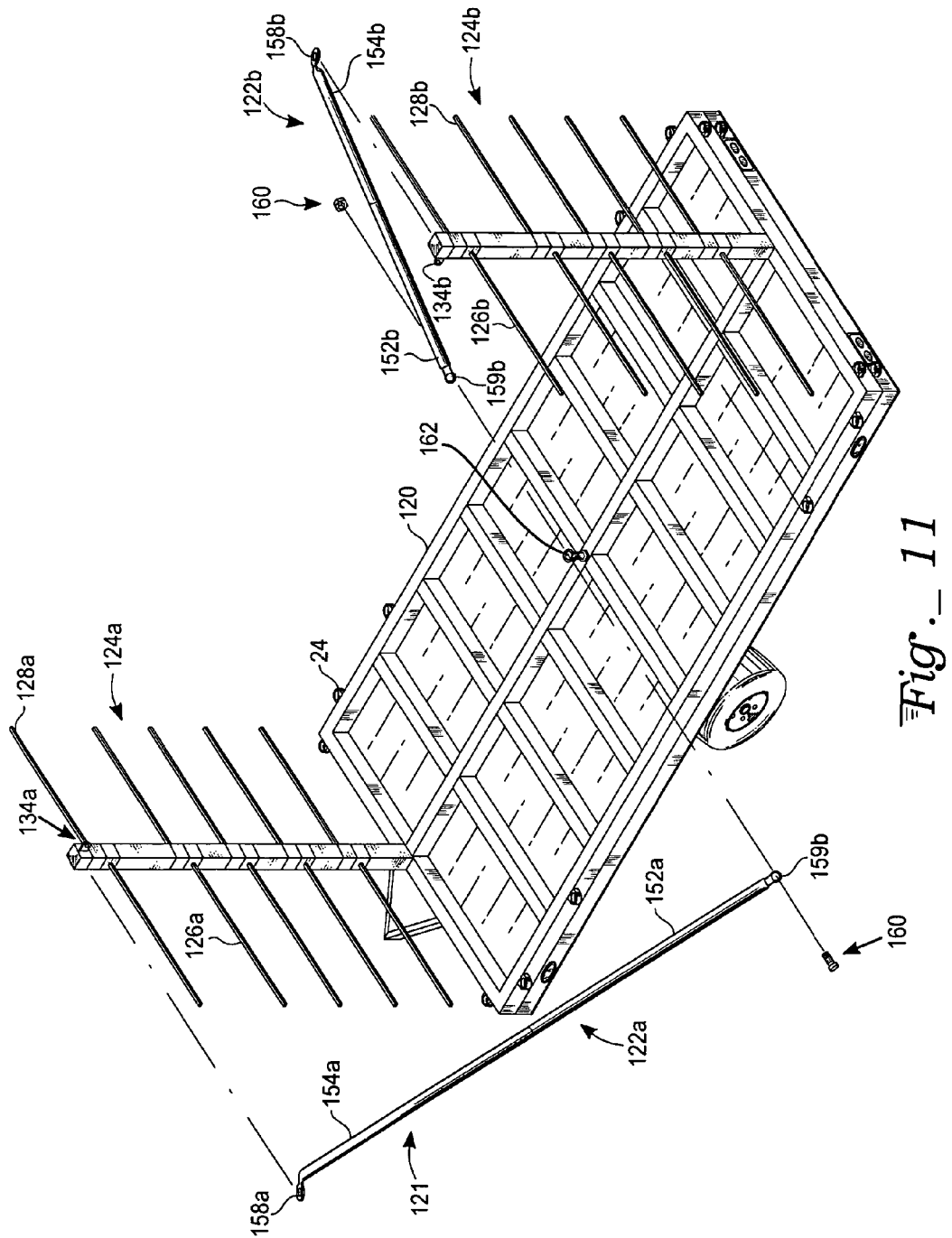
FIG. 11 is a perspective partial view of the watercraft pod of FIG. 10.

With reference to FIGS. 10 and 11, there is seen an interchangeable watercraft pod 116 of the present invention. Ladder tower assembly 118, including two ladder towers, 124a and 124b, and one adjustable brace assembly 121 comprising two adjustable braces 122a and 122b, comprise one watercraft pod 116. Any desired number of watercraft pods may be accommodated on an appropriately sized trailer. The watercraft pod may be used to transport, for example, water vehicles and/or accessories used for water sports and water vehicles in addition to other items.

The ladder tower assembly 118 of the watercraft pod may include frame 120. Frame 120 of the pod rests upon the trailer bed 14 and includes length and width dimensions that are the same or substantially the same as the length and width of flatbed 14. Fastener openings 24 and plates 22 (as described above) for fastening or other fastening means which may be disposed on the frame 120, align with the fastener openings 24 and/or plates 22 of the trailer bed 14 and/or other cargo pods that may be present.

Figure 12:
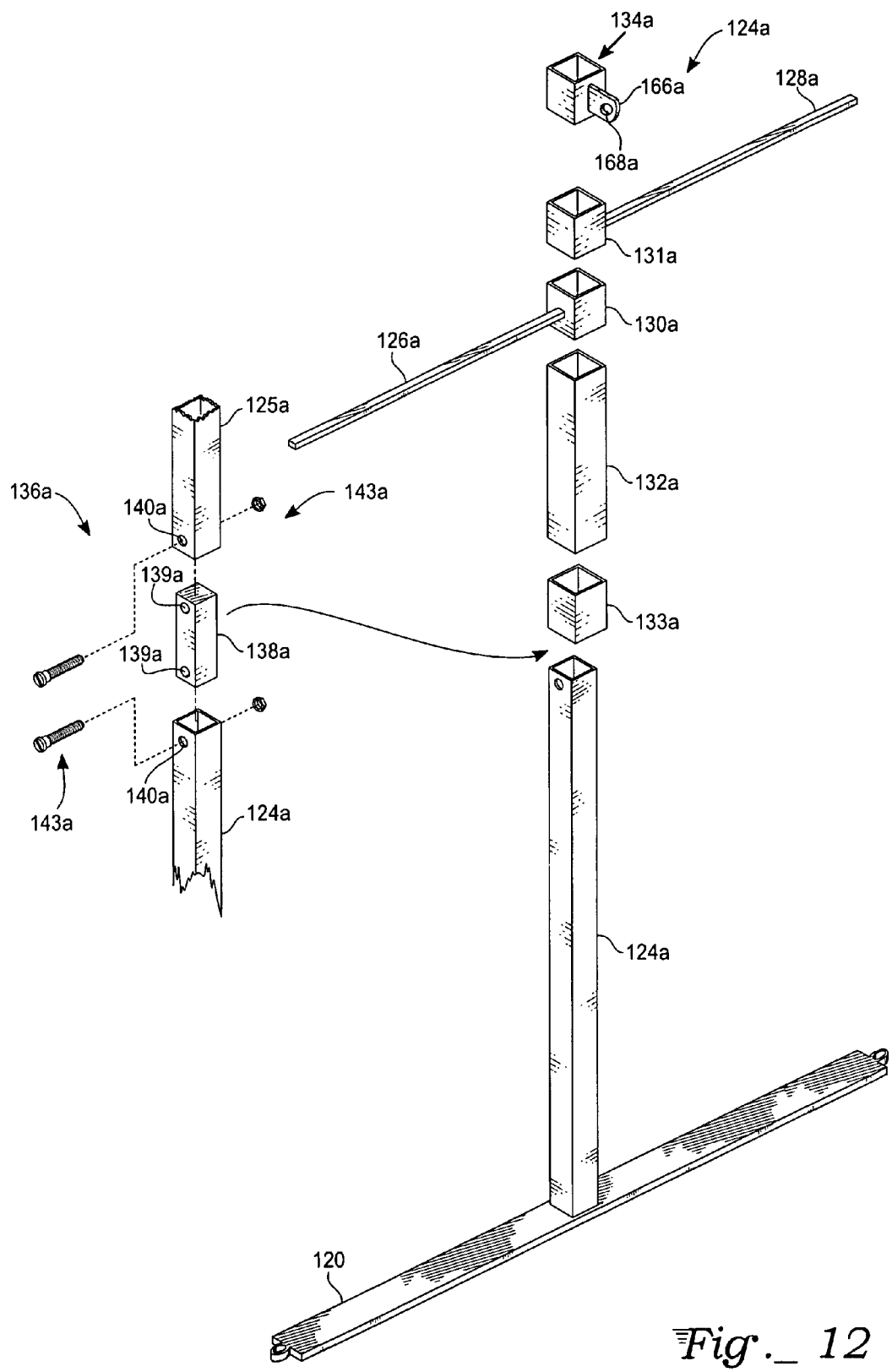
FIG. 12 is a perspective view of a portion of a ladder tower of FIG. 10.

With reference to FIG. 12, a part of one ladder tower 124a is shown. Ladder tower 124b (FIG. 11) has the same components, thus, only ladder tower 124a will be described in detail. Ladder tower 124a is connected to a part of frame 120. A first rung 126a and a second rung 128a extending in an opposite direction connected to rung spacers 130a and 131a are pictured. Any number of rungs and opposing rungs may be used to build each ladder tower.

Rungs 126a and 128a are connected to base 124a and to each other via rungs spacers and other spacers 132a and 133a via by either sleeving each rung spacer onto other spacers, or vice-versa. Rung spacer 130a is connected to a spacer 132a which sleeves, for example, onto another lower spacer 133a or vice versa. Lower spacer 133a sleeves over onto and down the base spacer 124a. Rung spacer 131a for rung 128a is sleeved onto rung spacer 130a for rung 126a. The shape of the spacers are depicted as rectangular, but may be any other shape, such as cylindrical. A lockdown 134a for an adjustable brace assembly 94 described below, completes each ladder tower and sleeves onto rung spacer 131a for rung 128a, completing the ladder assembly. The lockdown, has a height of, for example, 3 inches. This arrangement of rung spacers 130 and spacers 132 may be repeated a desired number of times to form a ladder tower of a desired height. To make a taller tower to accommodate more items, the series of spacers 132a, 130a, and 131a may be repeated, or an alternate arrangement of spacers may be used.

Spacers range, for example in height from 1 inch to 1 foot, and are typically 1 inch, 2 inch, 3 inch, or 1 foot spacers. In the depicted example, the base spacer 124a has a height of 2 feet, lower spacer 133a has a height of 3 inches, higher spacer 132a has a height of 1 foot, and rung spacers have a height of 3 inches.

The ladder tower 124a includes, in one embodiment, a height increaser assembly 136a which includes a height bar 138a stored within base spacer 124a. The height bar includes a lower fastener opening 139a which aligns with fastener opening 140a of base spacer 124a and an upper fastener opening 139a which aligns with lower fastener opening of upper height spacer 125a. The upper spacer 125a has the same cross-sectional dimensions as the base spacer. Thus, spacers which are able to slide over the base spacer, can also slide over the upper spacer. The lengths of the base spacer and upper spacer may vary from each other depending on the desired length of the extension of the base spacer. The base spacer 124a is a standard size and each spacer other than the base and height spacer has, for example, an opening larger than the opening of base spacer 124a to sleeve down over base spacer 124a and spacer 125a, if present. The height bar and the upper height spacer disposed above the height bar increase the height of the base over which other spacers slide. Upper spacer 125 acts as an extension of the base. When secured, with fastener such as 143a, the height bar provides added height to the ladder tower.

Referring back to FIG. 10, each rung 126 and 128 has a free end and extends in an opposite direction from the other. Each of rungs 126a and 128a (if present) pairs with an opposing, parallel, or substantially parallel rung 126b and 128b, respectively, to form a rung pair 142 that provides a support surface for a desired item. For example, rung pair 142 is formed by parallel and opposing rungs 126a and 126b. In another example, a rung pair is formed by parallel and opposing rungs 128a and 128b. Rungs 126a and 126b may be present with or without rungs 128a and 128b and vice-versa.

Distances between a higher rung pair and a lower rung pair may be changed to accommodate larger or smaller items. Items may also be stored on rung pairs 128a and 128b disposed on the other side of the ladder towers 124a and 124b. In the pictured example, the items are only stored on one side of the ladder tower assembly, however, the other side of the ladder tower assembly is free to receive items.

Rope or tie downs may be used to secure boats or other items to the pod.

With reference to FIGS. 10, 11, and 13, adjustable brace assembly 121 which is disposed between the two ladder towers 124a and 124b (FIG. 10) is seen. The adjustable brace assembly includes two adjustable braces 122a and 122b which provide support to a ladder tower assembly of varying size. The adjustable braces 122a and 122b each include a male member 152 insertable into a female member 154. The braces join with each other at the male ends to form a "v" shaped support structure.

The "v" shaped support structure connects to each ladder tower at the high ends of the "v" via the female members 154a and 154b and to the trailer flatbed 14 (or other interchangeable pod, such as pod 12) at the point of the "v" structure via the male members 152a and 152b. The male members connect to the flatbed via frame 120. In one example, a fastener ring 162 on the frame is used to fasten the braces 122a and 122b to each other and to the frame via the fastener openings 159a and 159b of the male members 152a and 152b. Any desired fastening means may be used. Fastener openings 158a and 158b and fasteners 160, such as nuts and bolts, are used to secure each female member to a ladder tower and to secure the male members to each other and to the trailer flatbed. Female members 154a and 154b of the brace are each connected to the adjustable brace lockdown 134a and 134b of each ladder tower 124a and 124b.

The elements of adjustable brace 122a are the same elements of adjustable brace 122b, thus only the elements of 122a will be discussed with regard to FIGS. 12 and 13. Adjustable brace lockdown 134a (FIG. 12) includes a fastener plate 166a and an opening 168a to receive fastening means to fasten the female member and thus the brace 122a to it and the ladder tower assembly 118. The female member 154a engages male member 152a by means of a movable pin 153. Each male and female member include pin holes 157 (twelve exemplary pin holes are pictured) which allow for a multitude of length choices and may result in large or "macro" length changes. The male member 152a may comprise, for example, two tubes 170a and 172a, each threadable within the other within sleeve 174 having threads. The male member 152a is, for example, solid within tube 170a. Threading one or both of the tubes 170a and 172a in a direction into or out of the sleeve 174 allows for length adjustments of the brace, such as "micro" adjustments, to be made. Thus, for a taller ladder tower assembly, each brace of the brace assembly may be lengthened and for a shorter ladder tower assembly each brace of the brace assembly may be shortened.

If desired, each pod of the present invention may be secured directly onto the trailer flatbed without the use of a frame.

With reference to FIG. 14, hitch 20, which may be used in conjunction with the trailer 10 of the present invention is seen. The hitch includes fastening means 178 for connecting hitch members 180 and 182 to one another.

With reference to FIG. 15, frame support 120, which can be used as a frame of the interchangeable watercraft pod of the present invention, or other pod, is seen. It includes internal frame members 121. It also includes fastener plates 24 and fastener openings 22. The fastener openings are in alignment with fastener openings of the flatbed 14 upon which the frame support 120 rests. The frame support on its own may be used to carry luggage and other miscellaneous items.

What is claimed is:

1. A bicycle pod transport system comprising:
a trailer having a flatbed with a length and a width, wheels disposed beneath the flatbed and at least one fastener opening disposed at a desired location of said trailer;
a first interchangeable pod having a width the same as the width of the flatbed, and at least one first interchangeable pod fastener opening, said at least one first interchangeable pod fastener opening in vertical alignment with said at least one fastener opening of said flatbed;
a second interchangeable pod having a width the same as the width of said first interchangeable pod, at least one second interchangeable pod fastener opening in vertical alignment with said at least one first interchangeable pod fastener opening, said second interchangeable pod having a different structural configuration than said first interchangeable pod and being stackable on said first interchangeable pod, wherein said first interchangeable pod is removably securable to said flatbed and said second interchangeable pod is removably securable to said first interchangeable pod and wherein said first interchangeable pod is capable of storing cargo independent of said second interchangeable storage pod and said second interchangeable pod and said second interchangeable pod is capable of storing cargo independent of said first interchangeable pod;
wherein said second interchangeable pod is a bicycle pod having a first row of inclined grooved supports, each grooved support inclined at substantially the same angle and configured to support front and rear tires of a bicycle in a groove; and
a first series of hooks configured to hook about a bicycle tire, one of said hooks disposed on each of said inclined grooved supports, said first series of hooks staggered in height across said series of inclined grooved supports, wherein bicycles are supportable by said first row of inclined grooved supports and said first series of hooks in a staggered height across said first row of inclined grooved supports.

2. The bicycle pod transport system of claim 1, further comprising:
a second row of inclined grooved supports, each grooved support of the second row inclined at substantially the same angle as other grooved supports of the second row and at a substantially opposite angle of the each of the grooved supports of the first row, front and rear tires of a bicycle, supportable in a groove of each grooved support, the pod having an alternating arrangement of first and second row inclined grooved supports; and
a second series of hooks configured to hook about a bicycle tire, one of said hooks disposed on each of said inclined grooved supports of said second row, said second series of hooks staggered in height across said second row of inclined grooved supports, wherein bicycles are supportable by said second row of inclined grooved supports and said second series of hooks in a staggered height across said second row of inclined grooved supports.

3. The bicycle pod transport system of claim 2 wherein said first series of hooks and said second series of hooks are staggered in height from highest to lowest in one or more sets, each set having a desired number of hooks.

4. The bicycle pod transport system of claim 1 wherein said first series of hooks are staggered in height from highest to lowest in sets of a desired number of hooks.

5. The bicycle pod transport system of claim 1 wherein said first series of hooks are staggered in height from highest to lowest.

6. The bicycle pod transport system of claim 1 wherein said bicycle pod includes a frame connectable to a trailer.

7. The bicycle pod transport system of claim 1 wherein each of said grooved supports is supported by a support stand.

8. The bicycle pod transport system of claim 7 wherein said bicycle pod is supportable on a trailer surface.

9. The bicycle pod transport system of claim 1 further comprising a hook and loop fastening wrap attached to each of said grooved supports configured to wrap about a bicycle tire.

10. The bicycle pod transport system of claim 1 further comprising a rod extending across the first row of grooved supports, and a plurality of turrets swivels rotatable about said rod, each of said swivels including a dowel retrievable from and retractable into said swivel turret, an end of said dowel including a fastener configured to fasten to a selected bicycle component when said dowel is retrieved from said turret swivel.

11. The bicycle pod transport system of claim 10 wherein said fastener is a hook and loop fastener.

12. The bicycle pod transport system of claim 10 wherein said turret swivel further comprises a dowel position lock.

13. The bicycle pod transport system of claim 1 wherein said second interchangeable pod is a bicycle pod comprising a first diagonal bicycle support with a groove and a hook connected to the first support, said support angled at a first angle and said groove of said first bicycle support configured to accept front and rear tires of a first bicycle and said hook configured to accept one of said front and rear bicycle tires of said first bicycle; and
a second diagonal bicycle support with a groove and another hook connected to the second support, said second support angled at an angle opposite said first angle and disposed behind the first diagonal bicycle support, said groove of said second bicycle support configured to accept front and rear tires of a second bicycle and said another hook configured to accept one of said front and rear tires of said second bicycle.

14. The bicycle pod transport system of claim 13 further comprising a row of first diagonal bicycle supports and a row of second, diagonal bicycle supports.

* * * * *